United States Patent [19]

Wakui et al.

[11] Patent Number: 4,608,616
[45] Date of Patent: Aug. 26, 1986

[54] TAPE CASSETTE HAVING A LOCK MECHANISM FOR LOCKING A TAPE PROTECTING LID

[75] Inventors: Yoshiaki Wakui, Tokyo; Hiroyuki Umeda, Yokohama, both of Japan

[73] Assignee: Victor Company of Japan, Ltd., Japan

[21] Appl. No.: 557,279

[22] Filed: Dec. 2, 1983

[30] Foreign Application Priority Data

Dec. 8, 1982 [JP] Japan .......................... 57-185541[U]
Dec. 13, 1982 [JP] Japan .......................... 57-188352[U]
Dec. 13, 1982 [JP] Japan .......................... 57-188353[U]

[51] Int. Cl.⁴ ..................... G11B 23/02; G11B 15/32; B65D 45/16
[52] U.S. Cl. .................................. 360/132; 242/199; 220/326
[58] Field of Search ............. 360/85, 93, 132, 130.33; 242/197, 198, 199; 220/326, 334, 339

[56] References Cited

U.S. PATENT DOCUMENTS

| | | | |
|---|---|---|---|
| 3,809,219 | 5/1974 | Esashi | 360/132 |
| 4,323,207 | 4/1982 | Gebeke | 242/198 |
| 4,466,583 | 8/1984 | Giannis et al. | 242/198 |
| 4,485,988 | 12/1984 | Kikuya et al. | 242/198 |
| 4,485,990 | 12/1984 | Ogiro et al. | 242/199 |
| 4,504,028 | 3/1985 | Goto | 360/132 |

FOREIGN PATENT DOCUMENTS

| | | |
|---|---|---|
| 0088438 | 9/1983 | European Pat. Off. . |
| 0097964 | 1/1984 | European Pat. Off. . |
| 2404967 | 8/1974 | Fed. Rep. of Germany . |
| 3150317 | 7/1982 | Fed. Rep. of Germany . |
| 0164066 | 9/1983 | Japan .................................. 360/132 |
| 2102386 | 2/1983 | United Kingdom . |

Primary Examiner—John H. Wolff
Assistant Examiner—Andrew L. Sniezek
Attorney, Agent, or Firm—Andrus, Sceales, Starke & Sawall

[57] ABSTRACT

A tape cassette comprises a cassette case made up from an upper half and a lower half which are connected together, a tape accommodated within the cassette case, a lid located at the front of the cassette case for covering the tape when the tape cassette is not in use, and a lock mechanism for locking the lid in its closed position when the tape cassette is not in use. The lock mechanism unitarily comprises a locking member which is made from a synthetic resin and is rotatably supported on a side wall of the upper half, an engaging part which engages with an engaging part of the lid which is in its closed position so as to restrict the rotation of the lid toward an opening direction, an acting arm portion which acts on the locking member so that a lock release member of a recording and/or reproducing apparatus releases the engagement between the engaging part of the lock mechanism and the engaging part of the lid when the tape cassette is loaded into the recording and/or reproducing apparatus, and a resilient arm portion which is in engagement with a part of the side wall of the upper half. The resilient arm portion undergoes resilient deformation and urges the engaging part of the lock mechanism in a direction so as to engage with the engaging part of the lid when the lid is closed, and restricts the rotational position of the locking member with respect to the upper half when the upper half is connected to the lower half.

5 Claims, 11 Drawing Figures

TAPE CASSETTE HAVING A LOCK MECHANISM FOR LOCKING A TAPE PROTECTING LID

BACKGROUND OF THE INVENTION

The present invention generally relates to tape cassettes having a lock mechanism for locking a tape protecting lid, and more particularly to a tape cassette having a lock mechanism for locking a tape protecting lid which is located at the front of a cassette case and is free to open and close, in its closed position when the tape cassette is not in use.

Generally, a tape cassette which is used with a video tape recorder, comprises a cassette case for accommodating a tape, and a tape protecting lid. The tape protecting lid is designed to close when the tape cassette is not in use, so as to cover and protect the tape which is exposed along the front of the cassette case. The tape protecting lid opens when the tape cassette is in use, so as not to interfere with a tape draw-out operation in which the tape is drawn out from the cassette case to be loaded into a predetermined tape path in the video tape recorder. Further, the tape cassette also comprises a lock mechanism provided with respect to the tape protecting lid. This lock mechanism locks the tape protecting lid in its closed position when the tape cassette is not in use. The locking of the tape protecting lid by the above lock mechanism is released when the tape cassette is loaded into the video tape recorder.

Conventionally, the lock mechanism was made up from a locking member, and a spring member which was independent of the locking member. Thus, because two independent parts constituted the lock mechanism, there was a problem in that the number of parts required to make the tape cassette could not be reduced, and that the number of assembling processes consequently could not be reduced. In addition, the lock mechanism was generally mounted on the cassette case in a rotatable manner. Thus, when connecting upper and lower halves which make up the cassette case, an instrument and the like had to be used to restrict the position of the lock mechanism during an assembling process in which the upper and lower halves were connected together. Therefore, there was a problem in that the production efficiency was low because of the additional step which was required to restrict the position of the lock mechanism during the assembling process in which the upper and lower halves were connected together.

Generally, after the upper half is placed on top of the lower half and connected, the upper and lower halves are secured to each other by screws. However, conventionally, there was no means for temporarily holding the upper and lower halves in place in a state where the upper half rests on top of the lower half. Thus, the upper half simply rested on top of the lower half without being held in place by some means, the upper and lower halves sometimes shifted or separated from one another before the upper and lower halves were secured together by the screws. In such cases, the upper half had to be correctly re-positioned on top of the lower half so that the process of securing the upper and lower halves together by the screws could be carried out. As a result, the upper and lower halves had to be handled with extreme care when securing the upper and lower halves together by the screws, because the upper and lower halves may shift or separate from one another. Therefore, there was a disadvantage in that the process of assembling the tape cassette could not be carried out with satisfactory efficiency.

SUMMARY OF THE INVENTION

Accordingly, it is a general object of the present invention to provide a novel and useful tape cassette having a lock mechanism, in which the above described problems and disadvantages have been eliminated.

Another and more specific object of the present invention is to provide a tape cassette having a lock mechanism for locking a tape protecting lid in its closed position, in which the lock mechanism is made up from a locking member which unitarily comprises a hook part which engages with a projection of the tape protecting lid, a part on which a lock release member of a video tape recorder acts when the tape cassette is loaded into the video tape recorder, and a resilient arm which resiliently urges the hook part to engage with the projection of the tape protecting lid. According to the tape cassette of the present invention, it is unnecessary to provide an independent spring member which must usually be provided with respect to the locking member, and the number of required parts can thus be reduced. In addition, the tape cassette is designed so that the resilient arm restricts the position of the locking member when assembling the tape cassette, so that the assembling process can be carried out with ease. Therefore, it is unnecessary to employ special instruments and the like to hold the locking member at a position which would facilitate the process of assembling the tape cassette by connecting upper and lower halves of a cassette case, and the production efficiency is accordingly improved.

Still another object of the present invention is to provide a tape cassette having a lock mechanism for locking a tape protecting lid in its closed position, in which an engaging part is formed on the locking member. This engaging part temporarily holds upper and lower halves of a cassette case in place so that the upper and lower halves do not shift or separate from one another, during the process of assembling the tape cassette by connecting the upper and lower halves. According to the tape cassette of the present invention, the upper and lower halves need not be handled with extreme care in a state where the upper half rests on top of the lower half to be secured together by screws. As a result, the process of securing the upper and lower halves together by the screws can be carried out efficiently, because the upper and lower halves can be handled with mode ease. If the upper half simply rests on top of the lower half when the process of securing the upper and lower halves together by the screws is carried out, this process must be carried out with extreme care so that the upper and lower halves do not shift or separate from one another. However, when the upper and lower halves are temporarily held in place as in the present invention, the upper and lower halves need not be handled with extreme care. Therefore, the process of securing the upper and lower halves together by the screws, can be carried out with satisfactory efficiency. Moreover, the upper and lower halves can be held in place without employing special instruments and the like.

A further object of the present invention is to provide a tape cassette having a lock mechanism which is made up from a locking member, in which a lower half of a cassette case has a guide part for guiding the locking member so that the locking member will not interfere with the process of assembling the tape cassette by connecting the upper and lower halves. When the upper half rests on top of the lower half, the locking member is released from the guidance provided by the guide part and rotationally returns to its original state, and the upper half is automatically and temporarily positioned in place with respect to the lower half. According to the tape cassette of the present invention, the upper half can automatically be positioned in place with respect to the lower half, by simply placing the upper half on top of the lower half. Therefore, the production efficiency is improved, and the tape cassette can be assembled automatically by use of assembling robots.

Other objects and further features of the present invention will be apparent from the following detailed description when read in conjunction with the accompanying drawings.

DETAILED DESCRIPTION

As shown in FIGS. 1A, 1B, 1C, and 2, a tape cassette 10 comprises a cassette case 11, and a tape protecting lid 12 which is provided at a front 11A of the cassette case 11.

Figure 3:
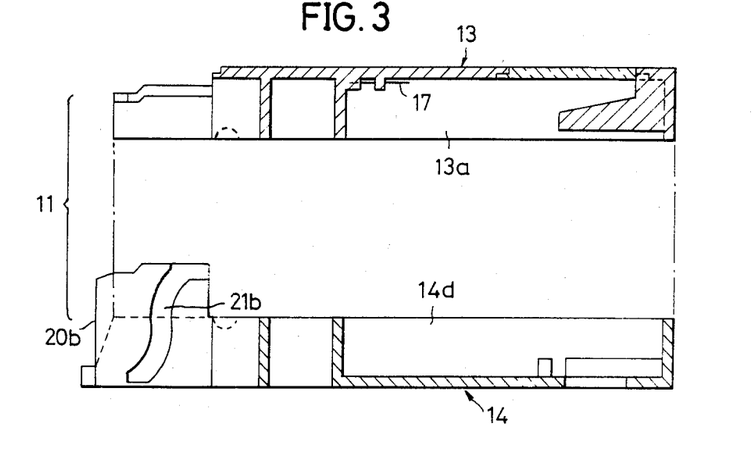
FIG. 3 is a side view in vertical cross section, showing upper and lower halves of a cassette case in a separated state.

The cassette case 11 is made up from an upper half 13 and a lower half 14 as shown in FIG. 3. These upper and lower halves 13 and 14 are both made of acrylonitrile butadiene styrene (ABS) resin. A supply reel 15 and a take-up reel 16 are accommodated within the cassette case 11, in a state where the reels 15 and 16 are pushed against the lower half 14 by a substantially V-shaped leaf spring 17 which is fixed to the upper half 13. A brake mechanism 18 is provided within the cassette case 11, at a location which is in the vicinity of a rear 11B thereof. A cutout opening 14a is formed at the front central part of the lower half 14, and loading poles (not shown) of a video tape recorder (not shown) enter into this cutout opening 14a when drawing a magnetic tape 22 out of the cassette case 11. Projecting side parts 14b and 14c which relatively extend frontward of the cassette case 11, are respectively formed at the right and left sides of the lower half 14. A side wall 14d which has one-half the height of the cassette case 11, extends along the outer edges of the side parts 14b and 14c.

The magnetic tape 22 is in a predetermined tape path 22A when the tape cassette 10 is not in use. The tape 22 is drawn out from the supply reel 15, passed through the side part 14b, guided by the tape guide parts 20a and 20b so as to cross the front of the cutout opening 14a, passed through the side part 14c, and then taken up by the take-up reel 16, to form this predetermined tape path 22A.

Figure 2:
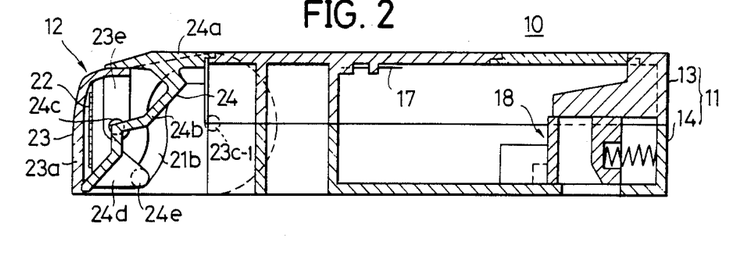
FIG. 2 is a side view in vertical cross section, showing the tape cassette along a line II—II in FIG. 1A.

The tape protecting lid 12 has a two-piece construction, and comprises an outer lid member 23 and an inner lid member 24. The tape protecting lid 12 is mounted at the front 11A of the cassette 11, and assumes a state shown in FIG. 2 when closed, and assumes a state shown in FIG. 4 when opened. When the tape protecting lid 12 is closed, the outer and inner lid members 23 and 24 cooperate to simultaneously protect the front surface (magnetic surface) and the rear surface of the tape 22, as shown in FIG. 2.

The outer lid member 23 comprises a front wall 23a which extends up to the top surface of the cassette case 11 so as to form a portion of the top surface of the cassette case 11, side walls 23b and 23c, and arms 23d and 23e which support the inner lid member 24. As shown in an enlarged scale in FIGS. 5 and 6, pin 23b-1 is located substantially at a center of the side wall 23b. Similarly, pin 23c-1 is located substantially at a center of the side wall 23c. See FIGS. 1B and 2. A side wall 13a of the upper half 13 cooperates with the side wall 14d of the lower half 14, to form bearings for the pins 23b-1 and 23c-1. Thus, the outer lid member 23 is rotatably supported in a state where the pins 23b-1 and 23c-1 are supported by the above bearings which are located at substantially one-half the height of the cassette case 11.

The inner lid member 24 comprises an elongated top plate 24a, and a sloping wall 24b which slopes downward toward the front of the cassette case 11 from the top plate 24a. The sloping wall 24b comprises projections 24c (only one shown) at a central part thereof, and arm portions 24d (only one shown) at a lower part thereof. The projections 24c on the sloping wall 24b respectively fit into holes which are formed in the arms 23d and 23e. The arm portions 24d respectively have a cam-following projection 24e (only one shown). The cam-following projections 24e fit into the cam grooves 21a and 21b, so that the cam-following projections 24e are movable along the cam grooves 21a and 21b. Hence, the inner lid member 24 is linked to the cassette case 11, in a state where the cam-following projections 24e are fitted into the cam grooves 21a and 21b. On the other hand, the inner lid member 24 is linked to the outer lid member 23, in a state where the projections 24c of the sloping wall 24b are pivotally supported by the holes in the arms 23d and 23e. Accordingly, the inner lid member 24 moves under guidance of the cam grooves 21a and 21b as the outer lid member 23 rotates.

Figure 5:
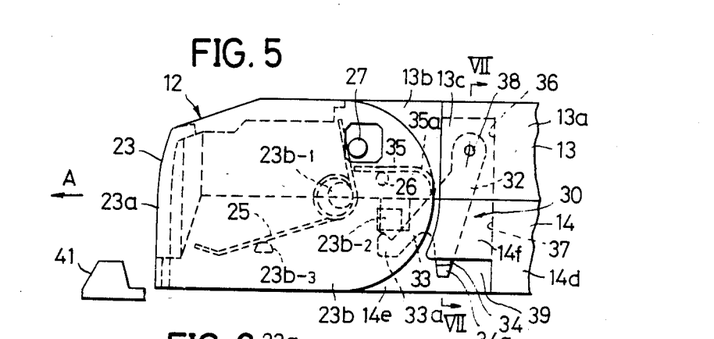
FIGS. 5 and 6 are side views respectively showing a tape protecting lid together with a locking mechanism in a state where an outer lid member is closed, and in a state where the outer lid member is open.

As shown in FIG. 5, the tape protecting lid 12 is normally urged toward its closing direction by a torsion spring 25, and is locked in its locked position by a lock mechanism 30 which will be described later on in the specification. The torsion spring 25 is fitted over the pin 23b-1, with one arm thereof mounted on a projection 27 which is formed on the side wall 13a of the upper half 13, and with the other end thereof mounted on a projection 23b-3 which is formed on the inner side of the side wall 23b. The torsion spring 25 is accommodated within a flat space 31 which will be described later on in the specification.

Figure 4:
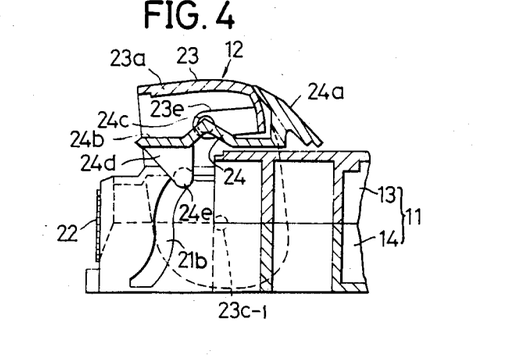
FIG. 4 is a side view in vertical cross section, showing a front part of the tape cassette in a state where a tape protecting lid is open.

When the tape cassette 10 is inserted into a cassette housing (not shown) within the video tape recorder (not shown), the locking with respect to the tape protecting lid 12 by the lock mechanism 30 is released. During a process in which the tape cassette 10 within the cassette housing is loaded into a predetermined position within the video tape recorder by lowering the cassette housing, the outer lid member 23 is rotated clockwise by approximately 90° against the force exerted by the torsion spring 25, by a pin 29 of the video tape recorder. As a result, the cam-following projections 24e of the inner lid member 24 are respectively guided along the cam grooves 21a and 21b, and the inner lid member 24 rotates clockwise about the pins 23b-1 and 23c-1 so that the lower edge of the sloping wall 24b does not make contact with the tape 22. Thus, the tape protecting lid 12 opens as shown in FIG. 4. Then, the loading poles of the video tape recorder which had relatively entered within the cutout opening 14a, move out of the cutout opening 14a without being interfered by the tape protecting lid 12. Accordingly, the loading poles intercept and draw the tape 22 out of the cassette case 11 from the front thereof.

When the force applied to the tape protecting lid 12 by the pin 29 so as to keep the tape protecting lid 12 open is cancelled during a cassette ejecting operation, the tape protecting lid 12 is automatically rotated counterclockwise by the force exerted by the spring 25, and assumes the closed position shown in FIGS. 2 and 5.

The lock mechanism 30 comprises a locking lever 32 which is molded from a polyacetal resin, and is located within the flat space 31. The space 31 is formed between the right side wall of the cassette case (depressed side wall portions 13b and 14e of the upper and lower halves 13 and 14) and the side wall 23b of the outer lid member 23. As shown in FIGS. 1A, 1B, and 5 through 7, the locking lever 32 unitarily comprises an elongated arm portion (resilient arm portion) 35, in addition to an engaging arm portion 33 and a lock releasing arm portion 34. The locking lever 32 is accommodated within a flat space 36 between side wall portions 13c and 13b, a flat space 37 between side wall portions 13f and 13e, and the flat space 31. The locking lever 32 is pivotally supported at an upper part thereof, by a pin 38 which is inserted into the upper half 13. The flat spaces 31, 36, and 37 respectively lie in a vertical plane.

As shown in FIG. 5, the outer lid member 23 of the tape protecting lid 12 has an engaging projection 23b-2 which is formed on the inner side of the side wall 23b. This engaging projection 23b-2 has a pentagon shape, and engages with an engaging part 33a of the engaging arm portion 33. The engaging part 33a of the engaging arm portion 33 is of a hook shape. The tape protecting lid 12 is locked in its closed position when there is engagement between the engaging projection 23b-2 and the engaging arm portion 33.

The elongated arm portion 35 is designed so that it can be deformed resiliently. Thus, the elongated arm portion 35 acts as a leaf spring. As shown in FIG. 5, the elongated arm portion 35 branches upwardly from an intermediate part of the engaging arm portion 33, and is curved counterclockwise at an arcuate portion 35a thereof, so that the elongated arm portion 35 extends to the left of the engaging arm portion 33 in FIGS. 5 and 6. The tip end of the elongated arm portion 35 is located between the projection 27 and a projection 26 which are formed on the side wall 13b of the upper half 13. The elongated arm portion 35 is spread apart from its stable state with respect to the engaging arm portion 33 when mounting the locking mechanism 30 onto the cassette case 11. Thus, due to the leaf spring effect of the elongated arm portion 35, the tip end of the elongated arm portion 35 presses against the projection 26, while the locking lever 32 is urged to rotate clockwise. Accordingly, in the state shown in FIG. 5, the engaging part 33a of the engaging arm portion 33 is in pressing engagement with the engaging projection 23b-2 of the outer lid member 23. Because the elongated arm portion 35 itself has the leaf spring effect, it is unnecessary to provide an independent spring member for urging the locking lever 32 in one direction, as in the case of the conventional tape cassette.

Figure 7:
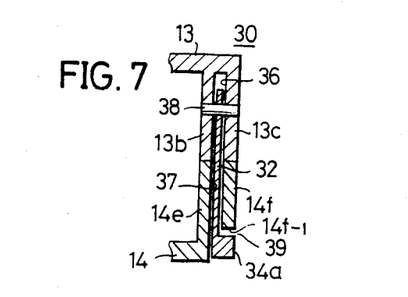
FIG. 7 is a view showing a lock mechanism in a cross section along a line VII—VII in FIG. 5.

A projecting portion 34a is formed at the lowermost part of the lock releasing arm portion 34, as best shown in FIG. 7. This projecting portion 34a is located within a depression 39 which is in the lower part of the side wall 14e of the lower half 14, and does not project from the right surface of the cassette case 11. As will be described later on in the specification, the projecting portion 34a is effectively used when assembling the tape cassette 10.

Figure 1A:
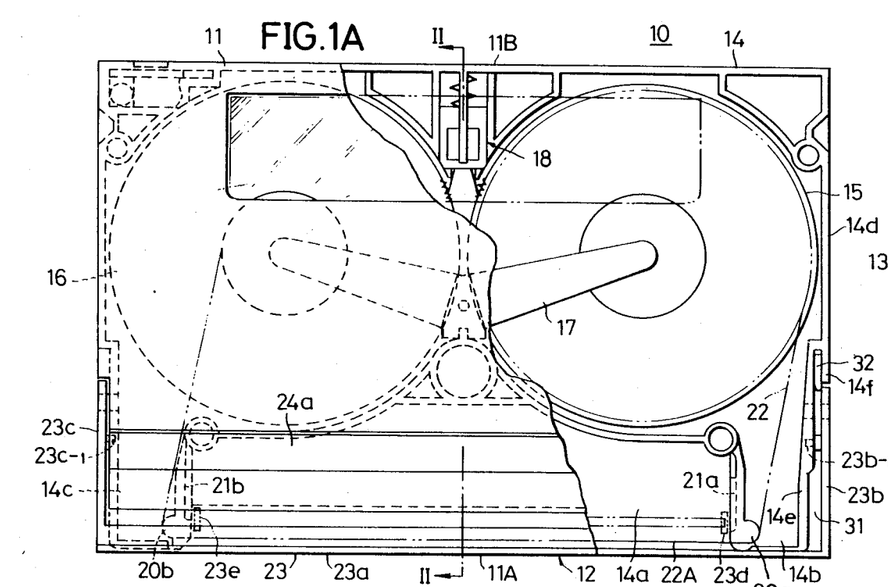
FIGS. 1A, 1B, and 1C are a plan view (with a right half of an upper half and a part of a tape protecting lid cut away), a front view, and a side view, respectively showing an embodiment of a tape cassette according to the present invention.
Figure 1B:
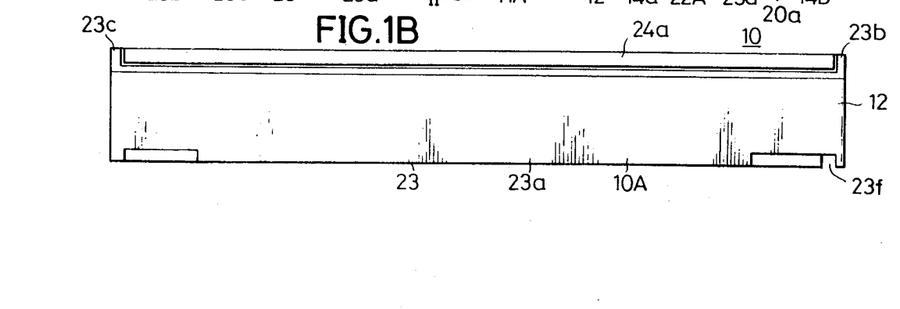
Figure 1C:
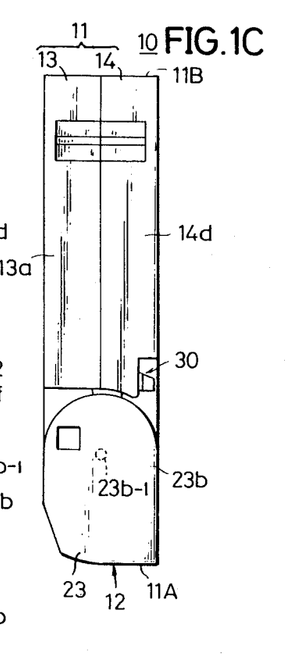
Figure 6:
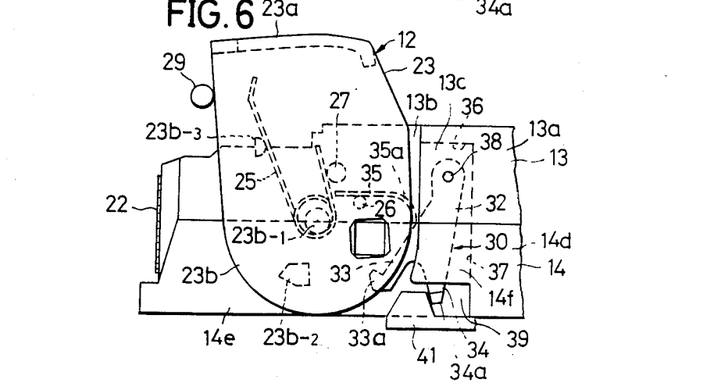

When the tape cassette 10 is inserted into the cassette housing of the video tape recorder in the direction of an arrow A shown in FIG. 5, a lock release lever 41 of the video tape recorder relatively enters into the cassette case 11 through a cutout 23f of the outer lid member 23. This cutout 23f is shown in FIG. 1B. When the tape cassette 10 is completely accommodated within the cassette housing, the lock release lever 41 relatively pushes the lower part of the lock releasing arm portion 34 of the locking lever 32. As a result, the locking lever 32 rotates counterclockwise against the resilient force exerted by the elongated arm portion 35, as shown in FIG. 6. Consequently, the engaging part 33a of the engaging arm portion 33 separates from the engaging projection 23b-2 of the outer lid member 23, and the locking with respect to the tape protecting lid 12 is released.

The tip end of the elongated arm portion 35 is stopped by the projection 26 or 27. Hence, the angular range in which the locking lever 32 can freely rotate, is defined and restricted by the projections 26 and 27. For this reason, when asembling the tape cassette 10, it is unnecessary to correct the position of the locking lever 32 so that the process of assembling the tape cassette 10 is facilitated, as will be described hereinafter.

Next, description will be given with respect to the function of the locking lever 32 when assembling the tape cassette 10.

The tape cassette 10 is assembled in the following sequence. That is, the tape protecting lid 12 is temporarily mounted onto the upper half 13 with the tape protecting lid 13 in its open position, with the locking lever 32 mounted onto the upper half 13. Thereafter, the upper half 13 is placed on top of the lower half 14 in which the reels 15 and 16 and the tape 22 are already set in place.

Figure 8:
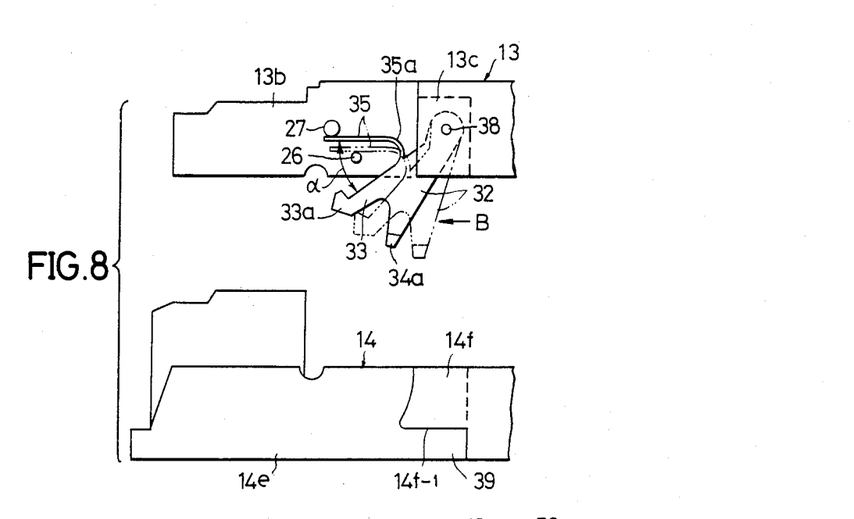
FIG. 8 is a diagram for explaining a process in which upper and lower halves are connected.

When connecting the upper and lower halves 13 and 14, the projecting portion 34a of the locking lever 32 is pushed in the direction of an arrow B in FIG. 8 by a finger and the like, so as to rotate the locking lever 32 clockwise from the original position indicated by a two-dot chain line in FIG. 8 up to a position indicated by a solid line. By rotating the locking lever 32 in this manner, the projecting portion 34a separates from an overhanging side wall portion 14f of the side wall 14e. Moreover, the tip end of the elongated arm portion 35 is stopped by the projection 27, and an angle α formed between the elongated arm portion 35 and the engaging arm portion 33 decreases. In other words, the elongated arm portion 35 undergoes resilient deformation in a direction such that the radius of curvature of the elongated arm portion 35 becomes smaller. As a result, a resilient force is accumulated in the elongated arm portion 35.

After the upper half 13 is placed on top of the lower half 14, the projecting portion 34a is let go, by releasing the finger tip and the like. Then, the locking lever 32 is forcibly rotated counterclockwise and returned to its original position shown in FIG. 5, due to the resilient force exerted by the elongated arm portion 35. That is, the projecting portion 34a enters within the depression 39 so as to oppose a lower side surface 14f-1 of the overhanging side wall portion 14f, as shown in FIG. 7. Accordingly, once the upper and lower halves 13 and 14 are connected, the projecting portion 34a will hit the lower side surface 14f-1 when an attempt is made to separate the upper and lower halves. Thus, once the upper and lower halves 13 and 14 are connected, the upper and lower halves 13 and 14 will be prevented from becoming separated from each other, and will be kept in a stable state where the upper and lower halves 13 and 14 are temporarily positioned in place with respect to each other. A process of securing the upper and lower halves 13 and 14 by screws, is carried out in the above state where the upper and lower halves 13 and 14 are temporarily positioned in place with respect to each other, and the assembling of the tape cassette 10 is completed when this process is completed.

Next, description will be given with respect to a method of assembling another embodiment of a tape cassette according to the present invention, by referring to FIGS. 9 through 11.

Figure 9:
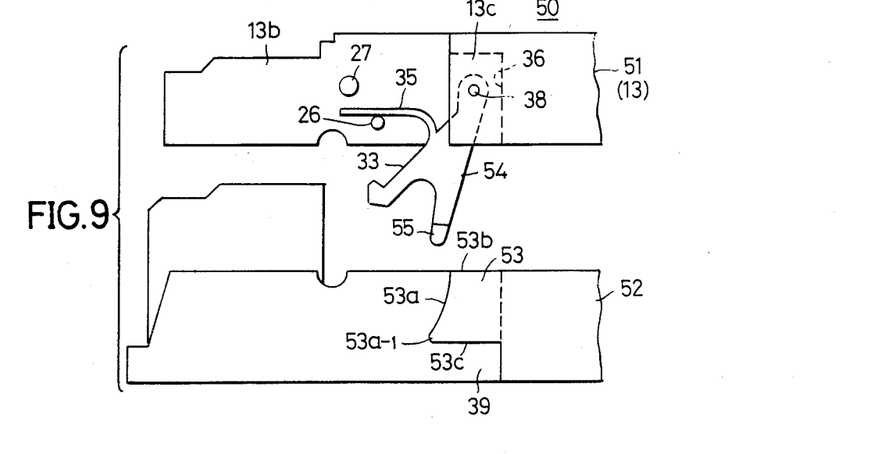
FIGS. 9, 10, and 11 are diagrams respectively showing another embodiment of a tape cassette according to the present invention, for explaining an engagement of a locking lever with the lower half when the tape cassette is assembled.

As shown in FIG. 9, a cassette case 50 is assembled by connecting upper and lower halves 51 and 52. The upper half 51 is identical to the upper half 13 of the cassette case 11 described before. The lower half 52 is identical to the lower half 14, except for an overhanging side wall portion 53 which has a shape different from the shape of the overhanging side wall portion 14f of the cassette case 11 described before. A locking lever 54 which is mounted onto the side wall of the upper half 51, is identical to the locking lever 32 in the embodiment described before, except for a projecting portion 55. In FIG. 9, those parts which are the same as those corresponding parts in FIG. 8 are designated by the same reference numerals.

The overhanging side wall portion 53 has a guide part 53a which is a curved side surface sloping leftwardly in FIG. 9. The projecting portion 55 of the locking lever 54, has a rounded tip end. In addition, in a state where the upper half 51 is supported horizontally, the locking lever 54 is urged to rotate counterclockwise due to its own weight, but the tip end of the elongated arm portion 35 is stopped by the projection 26, and the locking lever 54 is restricted at this rotational position. When the upper half 51 is positioned directly above the lower half 52, the projecting portion 55 of the locking lever 54 which is restricted at the rotational position shown in FIG. 9, opposes the guide part 53a of the overhanging side wall portion 53 of the lower half 52, that is, opposes a position deviated from an upper surface 53b of the overhanging side wall portion 53.

Figure 10:
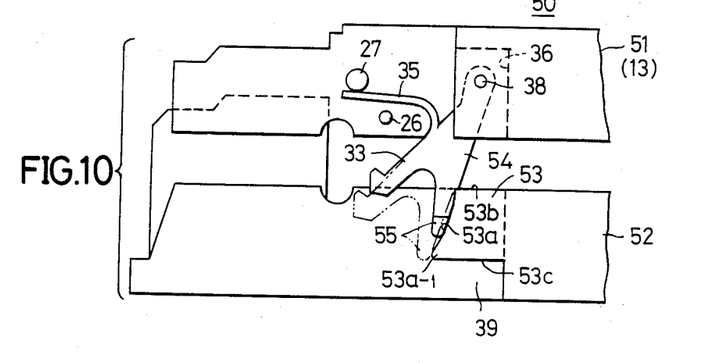
Figure 11:
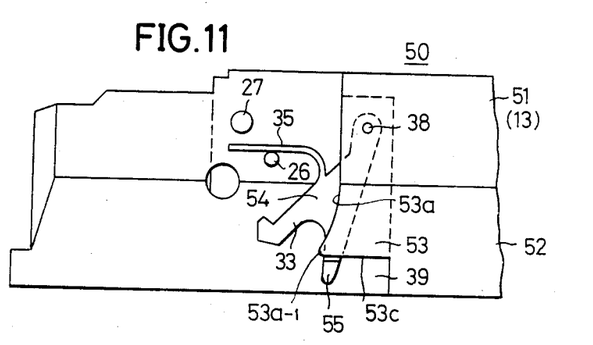

Accordingly, when the upper and lower halves 51 and 52 are moved closer together from the state shown in FIG. 9 to a state shown in FIG. 10, the projecting portion 55 is smoothly guided along the guide part 53a due to the rounded shape of the projecting portion 55 at the tip end thereof. As the upper half 51 is moved even closer to the lower half 52, the projecting portion 55 of the locking lever 54 is guided along the guide part 53a, and the locking lever 54 is rotated clockwise as indicated by a two-dot chain line in FIG. 10. Thus, the elongated arm portion 35 is stopped by the projection 27, and accumulates a resilient force while undergoing resilient deformation.

When the upper half 51 is finally makes contact with and rests on top of the lower half 52, the projecting portion 55 rides over an apex portion 53a-1 of the guide part 53a. As a result, the locking lever 54 is automatically rotated counterclockwise due to the resilient force exerted by the elongated arm portion 35 as shown in FIG. 11, and the elongated arm portion 35 is quickly returned by the resilient force exerted by the elongated arm portion 35 to its original rotational position where the tip end thereof is stopped by the projection 26. Thus, the projecting portion 55 rides over the apex portion 53a-1 and enters within the space 39, so as to oppose a lower side surface 53c of the overhanging side wall portion 53. Therefore, the upper and lower halves 51 and 52 are temporarily connected together in place with respect to each other, as in the previously described embodiment.

According to the present embodiment of the tape cassette, it is unnecessary to hold the locking lever 54 by a finger and the like in order to prevent the locking lever 54 from hitting the lower half 52 and interfering with the process of assembling the tape cassette, when the upper and lower halves 51 and 52 are connected. Hence, it becomes possible to employ assembling robots to assemble the cassette case 50, which will improve the production efficiency.

Further, the present invention is not limited to these embodiments, but various variations and modifications may be made without departing from the scope of the present invention.

What is claimed is:

1. A tape cassette comprising:
   a cassette case made up from an upper half and a lower half which are connected together, said cassette case having a pair of side wall portions which are provided on a side wall of said upper half;
   a tape accommodated within said cassette case, said tape being in a predetermined tape path along the front of said cassette case when the tape cassette is not in use;
   a tape protecting lid located at the front of said cassette case, said tape protecting lid being closed to cover said tape in said predetermined tape path when the tape cassette is not in use, and being open so as not to interfere with an operation in which said tape is drawn out of said cassette case when the tape cassette is in use; and
   a lock mechanism for locking said tape protecting lid in its closed position when the tape cassette is not in use, said lock mechanism comprising a locking member which is rotatable about a pin, said pin being disposed across said pair of side wall portions, said locking member being made from a synthetic resin, and unitarily comprising an engaging part which engages with an engaging part of said tape protecting lid when the latter is in its closed position so as to restrict the rotation of said tape protecting lid toward an opening direction, a lock releasing arm portion which forms part of said locking member so that a lock release member of a recording and/or reproducing apparatus releases the engagement between said engaging part of said lock mechanism and said engaging part of said tape protecting lid when the tape cassette is loaded into the recording and/or reproducing apparatus, a resilient arm portion which is in engagement with a part of the side wall of said upper half, said resilient arm portion undergoing resilient deformation and urging said engaging part of said lock mechanism in a direction so as to engage with said engaging part of said tape protecting lid when said tape protecting lid is closed and restricting the rotational position of said locking member with respect to said upper half when said upper half is connected to said lower half, and a projecting portion which engages with an overhanging sidewall portion of said lower half when said upper half is connected to said lower half, and temporarily connects said upper and lower halves in place with respect to each other so that said upper and lower halves do not separate.

2. A tape cassette as claimed in claim 1 in which said resilient arm portion has an arcuate portion at a base end thereof, and said resilient arm portion accumulates a resilient force for rotating said locking member by undergoing deformation so that the radius of curvature of said arcuate portion changes.

3. A tape cassette as claimed in claim 1 in which said projecting portion of said locking member is located at a lowermost part of said lock releasing arm portion.

4. A tape cassette as claimed in claim 1 in which said locking member is made from a polyacetal resin.

5. A tape cassette comprising:
a cassette case made up from an upper half and a lower half which are connected together, said cassette case having a pair of side wall portions which are provided on a side wall of said upper half;
a tape accommodated within said cassette case, said tape being in a predetermined tape path along the front of said cassette case when the tape cassette is not in use;
a tape protecting lid located at the front of said cassette case, said tape protecting lid being closed to cover said tape in said predetermined tape path when the tape cassette is not in use, and being open so as not to interfere with an operation in which said tape is drawn out of said cassette case when the tape cassette is in use; and
a lock mechanism for locking said tape protecting lid in its closed position when the tape cassette is not in use, said lock mechanism comprising a locking member which is rotatable about a pin, said pin being disposed across said pair of side wall portions,
said locking member being made from a synthetic resin, and unitarily comprising an engaging part which engages with an engaging part of said tape protecting lid which the latter is in its closed position so as to restrict the rotation of said tape protecting lid toward an opening direction, a lock releasing arm portion which forms part of said locking member so that a lock release member of a recording and/or reproducing apparatus releases the engagement between said engaging part of said lock mechanism and said engaging part of said tape protecting lid when the tape cassette is loaded into the recording and/or reproducing apparatus, a resilient arm portion which is in engagement with a part of the side wall of said upper half, said resilient arm portion undergoing resilient deformation and urging said engaging part of said lock mechanism in a direction so as to engage with said engaging part of said tape protecting lid when said tape protecting lid is closed and restricting the rotational position of said locking member with respect to said upper half when said upper half is connected to said lower half, and a projecting portion which engages with an overhanging sidewall portion of said lower half when said upper half is connected to said lower half and temporarily connects said upper and lower halves in place with respect to each other so that said upper and lower halves do not separate, said lower half having a guide part for guiding said projecting portion of said locking member so that said locking member is rotated in a predetermined direction from the rotational position where said locking member is restricted when said upper half is connected to said lower half, said resilient arm portion undergoing resilient deformation as said locking member is rotated in said predetermined direction, said locking member being rotationally returned by the resilient force accumulated in said resilient arm portion so that said projecting portion engages with said overhanging sidewall portion of said lower half when said upper and lower halves are connected and said projecting portion is released from the guidance by said guide part of said lower half.

* * * * *